United States Patent [19]
Montgomery

[11] 3,825,924

[45] *July 23, 1974

[54] PULSE CODE MODULATION CODE CONVERSION

[75] Inventor: William Lloyd Montgomery, Little Silver, N.J.

[73] Assignee: Bell Telephone Labortories, Incorporated, Murray Hill, N.J.

[ * ] Notice: The portion of the term of this patent subsequent to Aug. 29, 1989, has been disclaimed.

[22] Filed: June 27, 1972

[21] Appl. No.: 266,690

[52] U.S. Cl....... 340/347 DD, 179/15 AC, 235/152, 235/154

[51] Int. Cl........................................... G06f 7/38

[58] Field of Search....... 235/152, 156, 92 CP, 154; 340/347 DD; 179/15 A, 15 P, 15 AC, 15 AV

[56] References Cited

UNITED STATES PATENTS 3,688,097 8/1972 Montgomery...................... 235/152

*Primary Examiner*—Paul J. Henon
*Assistant Examiner*—Leo H. Boudreau
*Attorney, Agent, or Firm*—R. O. Nimtz; S. J. Phillips

[57] ABSTRACT

Method and apparatus for the direct digital conversion between PCM codes representing two different companding laws. The mu-law and the A-law code words each contain the eight bits S ABC WXYZ, where S is the sign of the signal sample, ABC is the segment code, and WXYZ is the position code. Together the segment and position codes describe the amplitude of the signal sample, which is generally different in the two systems. Code conversion is accomplished by identifying the value of the segment code and selectively incrementing, decrementing and shifting the position code. Mid-riser as well as mid-tread forms of the A-law are considered.

11 Claims, 15 Drawing Figures

PULSE CODE MODULATION CODE CONVERSION

FIELD OF THE INVENTION

This invention relates to electrical communications and more particularly to systems for code conversion between different PCM (Pulse Code Modulation) codes. Such codes may be used in long haul telephone transmission systems.

BACKGROUND OF THE INVENTION

PCM signals consist of binary code words representing the instantaneous value of a periodically sampled and quantized analog signal. Usually PCM code words are sent in a serial bit stream to a receiving station where they are decoded into output voltage levels. These output voltage levels are smoothed to produce a replica of the original input signal. The precise relationship between the analog signal levels and the corresponding PCM code words is determined by the particular companding law employed.

Two companding laws of particular interest are the mu-law, which is likely to come into widespread usage in the telephone systems in the United States, and the A-law now planned for use in European telephone systems. Generally the same signal amplitude will be represented by different binary code words in the two systems. Through international agreement certain parameters are to be the same in the two systems, such as word size and sampling rate. However, the basic dissimilarity in the two companding laws remains. For further background on this problem, see the article "PCM: A Global Scramble for Systems Compatibility" in ELECTRONICS, June 23, 1969, pp. 94–102.

The problem of disparate coding systems is met head-on in the case of transatlantic telephone calls carried via PCM transmission facilities. Arriving PCM code words encoded according to, say, the A-law cannot be placed directly upon the domestic mu-law telephone network. With such a mismatched arrangement, speech and analog data signals would be severely distorted. Providing A-law decoders in the domestic network is economically undesirable since the international traffic is only a tiny fraction of the total traffic in the domestic network. The economics of the situation virtually compels the use of code converters placed at the terminal point of international PCM links converter A- to mu-law and vice versa.

DESCRIPTION OF THE PRIOR ART

One way of performing code conversion is to provide, say, an A-law decoder which reduces the input code to a smooth analog replica of the original signal followed by a mu-law encoder to convert this analog signal into the output mu-law code. This scheme requires relatively large amounts of circuitry since PCM coders and decoders are relatively complex devices. Further, the processes of reencoding a second time will generally introduce additional distortion. Direct digital conversion as performed by the present invention is a superior method in giving more uniform results.

Literature suggesting such direct digital conversion have proposed code transformation inferior to those implemented by the present invention. See the Consulation Committee International for Telephone and Telegraph (CCITT) Temporary Document 25-E, Special D Group, Nov. 3, 1969 pp. 7–10. The transformation proposed in that document has a higher signal-noise ratio and higher harmonic distortion than that implemented in the present invention.

SUMMARY OF THE INVENTION

The present invention is a direct digital code converter. It operates upon code words in a first PCM code to produce code words in a second PCM code. A selected portion of the input word is decoded and, depending upon its value, a selected portion of the input word is decoded and, depending upon its value, a selected portion of the input word is incremented, decremented or shifted in order to produce the appropriate output word.

In various embodiments, this invention is used to convert from A-law to mu-law and from mu-law to A-law. The design of the embodiments make use of the fact that approximately the same peak signal level is entertained by the encoders in each system. In one embodiment, the A-law is of mid-tread design, and in a second embodiment the A-law is of mid-riser design.

Advantages afforded by this invention include a reduced number of logic components since only the segment ABC of the input code word need be decoded, and that decoding requires only that the binary value of ABC be determined, not that it be changed to a smooth analog signal. Relatively simple circuitry may be used to implement the invention in contrast with a more complex circuitry necessary for decoding to analog and re-encoding. More consistent recoding also results from the digital-digital nature of the circuitry.

DETAILED DESCRIPTION

Figure 1:
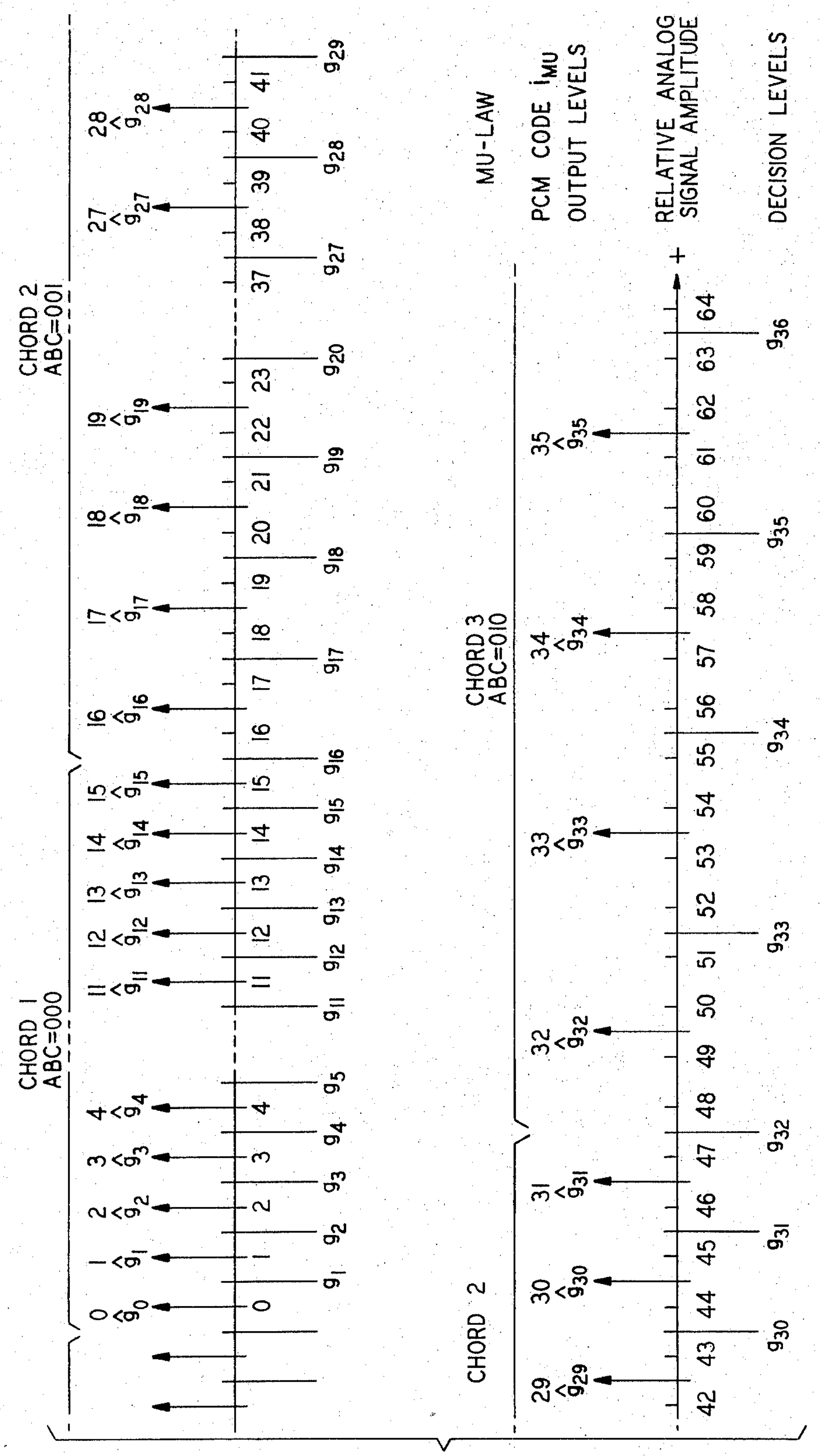
FIG. 1 is a characterization of an eight-bit mu-law code.

FIG. 1 is a detailed characterization of the eight-bit mu-law encoding scheme. When taken in combination with Equations 1–3 shown below, the complete code is rigorously specified. The horizontal axis in FIG. 1 represents the analog signal amplitude positive going to the right. Along this analog amplitude scale are spaced decision levels $g_i$ and output levels $\hat{g}_i$. Negative values are not shown, since they differ only in sign.

The physical interpretation of decision levels and output levels is as follows: An analog signal amplitude falling between the decision levels $g_i$ and $g_{i+1}$ is represented by the quantized amplitude $\hat{g}_i$. $\hat{g}_i$, in turn, is represented by the subscript itself $i$ which in eight-bit binary form becomes the transmitted PCM signal. Thus, for example, $i = 19$ (binary 10011) represents any signal sample between the limits of 21.5 and 23.5 units of signal amplitude, quantized to the value of 22.5. Any sample falling within the range is therefore transmitted as a binary word S ABC WXYZ = 0 001 0011.

It will be observed that for increasing values of ABC, output levels $\hat{g}_i$ are spaced by increasing amounts. It is thus nonlinearity which causes speech amplitude compression at the encoder and expansion at the decoder (companding).

For the mu-law, each value of ABC represents a "chord." There are sixteen chords, eight for each sign, though only three positive going chords are shown in FIG. 1 for brevity. Since the $\hat{g}_i$ spacing is equal in the first chord for each sign, these two chords are generally considered combined into a single "segment." This encoding scheme is therefore frequently referred to in the literature as 15-segment encoding. WXYZ is the "position code" identifying the position on the segment of the corresponding output level. S is the sign of the sign of the analog sample.

Equations 1–3 below complete the specification of one eight-bit mu-law code.

| | | | |
|---|---|---|---|
| $j=1$ | $g_1=i=0.5$ | $i=1,2,\ldots,15$ | |
| $j=2$ | $g_i=2i-16.5$ | $i=16,17,\ldots,31$ | |
| $j=3$ | $g_i=4i-80.5$ | $i=32,33,\ldots,47$ | |
| $j=4$ | $g_i=8i-272.5$ | $i=48,49,\ldots,63$ | (1) |
| $j=5$ | $g_i=16i-784.5$ | $i=64,65,\ldots,79$ | |
| $j=6$ | $g_i=32i-2064.5$ | $i=80,81,\ldots,95$ | |
| $j=7$ | $g_i=64i-5136.5$ | $i=96,97,\ldots,111$ | |
| $j=8$ | $g_i=128i-12304.5$ | $i=112,113,\ldots,128$ | |
| | $\hat{g}_i=g_i+2^{(j-2)}$ | $\begin{cases} j=1,2,\ldots,8 \\ i=1,2,\ldots,127 \end{cases}$ | (2) |
| | $\hat{g}_0=0$ | | (3) |

For each chord $j$, Equation (1) specifies decision levels $g_i$ appearing in that chord. Equation (2) specifies output levels $\hat{g}_i$ in terms of decision levels $g_i$ and chord number $j$.

Equation (3) defines output level $\hat{g}_o = 0$. This identifies the encoding scheme of FIG. 1 as being of "mid-tread" design, in contrast to "mid-riser" design. Mid-tread design occurs when an input analog signal of zero amplitude generates a decoded output level of zero amplitude, that is, an output level occupies the origin; whereas, mid-riser design generates a nonzero decoded output level for zero amplitude input, because a decision level occupies the origin.

Figure 2:
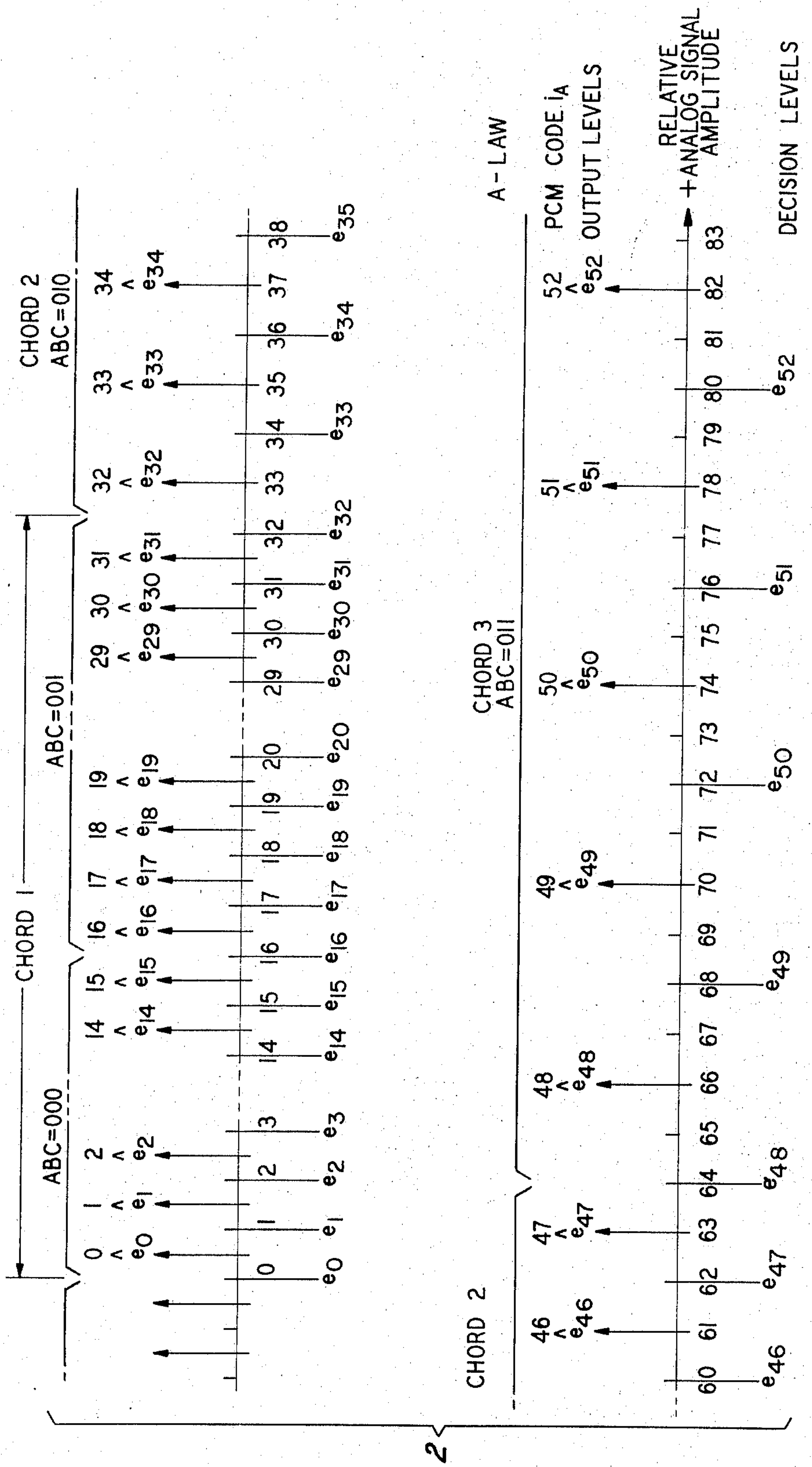
FIG 2 is a characterization of an eight-bit A-law code of mid-riser design.

FIG. 2, when taken with Equations (4) and (5) below, is a characterization of one eight-bit A-law code.

| | | | |
|---|---|---|---|
| $j=1$ | $e_i=i$ | $i=0,1,2,\ldots,31$ | |
| $j=2$ | $e_i=2i-32$ | $i=32,33,\ldots,47$ | |
| $j=3$ | $e_i=4i-128$ | $i=48,49,\ldots,63$ | |
| $j=4$ | $e_i=8i-384$ | $i=64,65,\ldots,79$ | (4) |
| $j=5$ | $e_i=16i=1024$ | $i=80,81,\ldots,95$ | |
| $j=6$ | $e_i=32i-2560$ | $i=96,97,\ldots,111$ | |
| $j=7$ | $e_i=64i-6144$ | $i=112,113,\ldots,128$ | |
| | $\hat{e}_i=e_i+2^{(j-2)}$ | $\begin{cases} j=1,2,\ldots,7 \\ i=0,1,2,\ldots,127 \end{cases}$ | (5) |

The A-law as thus defined is different in three major respects from the mu-law. First, the A-law is mid-riser in design. Decision level $e_0$ appears at the zero amplitude point on the axis, i.e., $e_0 = 0$. By contrast, there is no decision level $g_0$ appearing in the mid-tread mu-law code of FIG. 1 (Equation 1). With only slight modification to FIG. 2, the A-law can be made mid-tread also. Sliding each output and decision level to the left by one-half unit on the axis and eliminating decision level $e_0$ will accomplish this end. Equations (4) and (5) are similarly modified by reducing each value $e_i$ and $\hat{e}_i$ by 0.5 unit.

The second major difference is in the number of linear segments. A-law decision levels up to $e_{32}$ are equally spaced from their lower neighboring decision level. This range encompasses two values of ABC, i.e., ABC = 000 and 001 which together comprise a single chord. Thus there are seven chords on either side of the origin of in the A-law. As with the mu-law, the two chords on either side of the origin are generally considered a single segment in the literature, giving rise to the designation of the A-law as a thirteen-segment companding law.

The third major difference is that the size of unit steps in amplitude is larger in practice for A-law than for the mu-law. It will be understood that the numerical values appearing on the horizontal scales for FIGS. 1 and 2 are relative to the smallest decision increment. A knowledge of the expected peak signal (clipping) level $V_{peak}$ is necessary to properly scale the signal values. From equations (1) and (4), the peak signal levels are $V_{peak\text{-}mu} = g_{128} = 4079.5$ units and $V_{peak\text{-}A} = e_{128} = 2{,}048$ units for the mu-law and A-law respectively. Thus unit amplitude is 1/4,079.5 and 1/2,048 of the respective clipping levels, so that signals on the horizontal scales in FIGS. 1 and 2 may be normalized by multiplying by the factors $V_{peak\text{-}mu}/$ 4,079.5 and $V_{peak\text{-}A}/$ 2,048 respectively.

Although it is not necessary that the clipping levels for the telephone systems using the mu-law be the same as for telephone systems using the A-law, in practice the European A-law systems and U.S. mu-law systems are expected to have clipping levels which are approximately the same, or approximately +3 dBmO. Thus the ratio of A-law unit amplitude to the mu-law unit amplitude is approximately $$V_{peak\text{-}A}/\ 2{,}048/V_{peak\text{-}mu}/\ 4{,}079.5 = 4{,}079.5/\mathbf{2{,}048} \div 2 \qquad \mathbf{(6)}$$

The assumption will be made throughout the description below the peak (clipping) levels are equal in the two systems. If this assumption is not true in practice and the actual clipping levels are slightly different, the effect will be a slight gain or attenuation in the resultant analog signal after PCM code conversion has taken place. This effect is not objectionable in telepohne systems where such PCM conversion will be employed.

Figure 3:
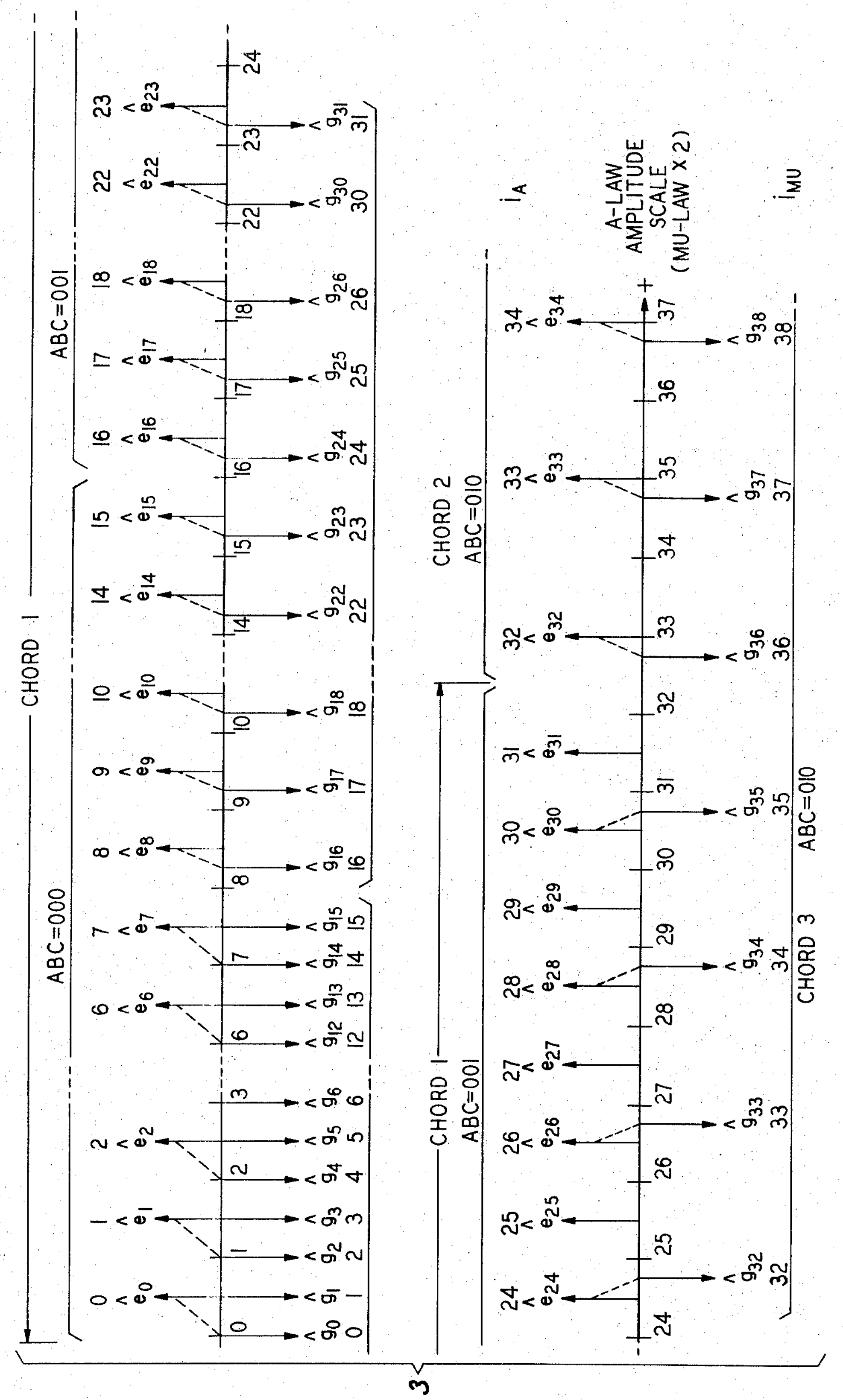
FIG. 3 is a portion of the conversion from mu-law to A-law assuming equal clipping levels.

FIG. 3 shows some of the mu-law and A-law output levels of FIGS. 1 and 2 drawn to the same relative amplitude scale to illustrate mu to A conversion. The amplitude scale is that of the A-law so that $\hat{e}_i$ values are the same as those appearing in FIG. 2. The $\hat{g}_i$ values may be determined by multiplying the amplitude scale by a factor of two as indicated by equation (6). Dotted lines connect mu-law output levels to their recoded A-law counterparts. Each A-law output level has been chosen to minimize the errror in representing the associated mu-law decision interval.

It is clear that $\hat{e}_7$ is the proper A-law output level to represent $\hat{g}_{15}$ and vice versa. Thus, $i_{mu} = 15$ should be converted to $i_A = 7$ and vice versa. The case is not so clear in the case of $\hat{g}_{14}$. From FIG. 3 it would seem that either $\hat{e}_6$ or $\hat{e}_7$ could represent the decision interval $g_{14} - g_{15}$ equally well. In fact, however, mathematical analysis of noise contribution by the recoding process shows that $\hat{e}_7$ is the better of the two. It is inevitable that some noise will be introduced by the recoding process since the output levels are not all perfectly aligned. However, noise has been held to a minimum in the conversions implemented by the various embodiments of this invention by separately minimizing the noise contribution for each output level $\hat{g}_i$. For each decision interval $g_{i-1} - g_i$ represented by $\hat{g}_i$ a noise calculation was performed for various values of $\hat{e}_i$ and the value of $\hat{e}_i$ introducing the least noise component was chosen for the conversion. Methods for performing such calculations are found in the literuature and are well known to those with ordinary skill in the art of PCM equipment design.

Figure 7:
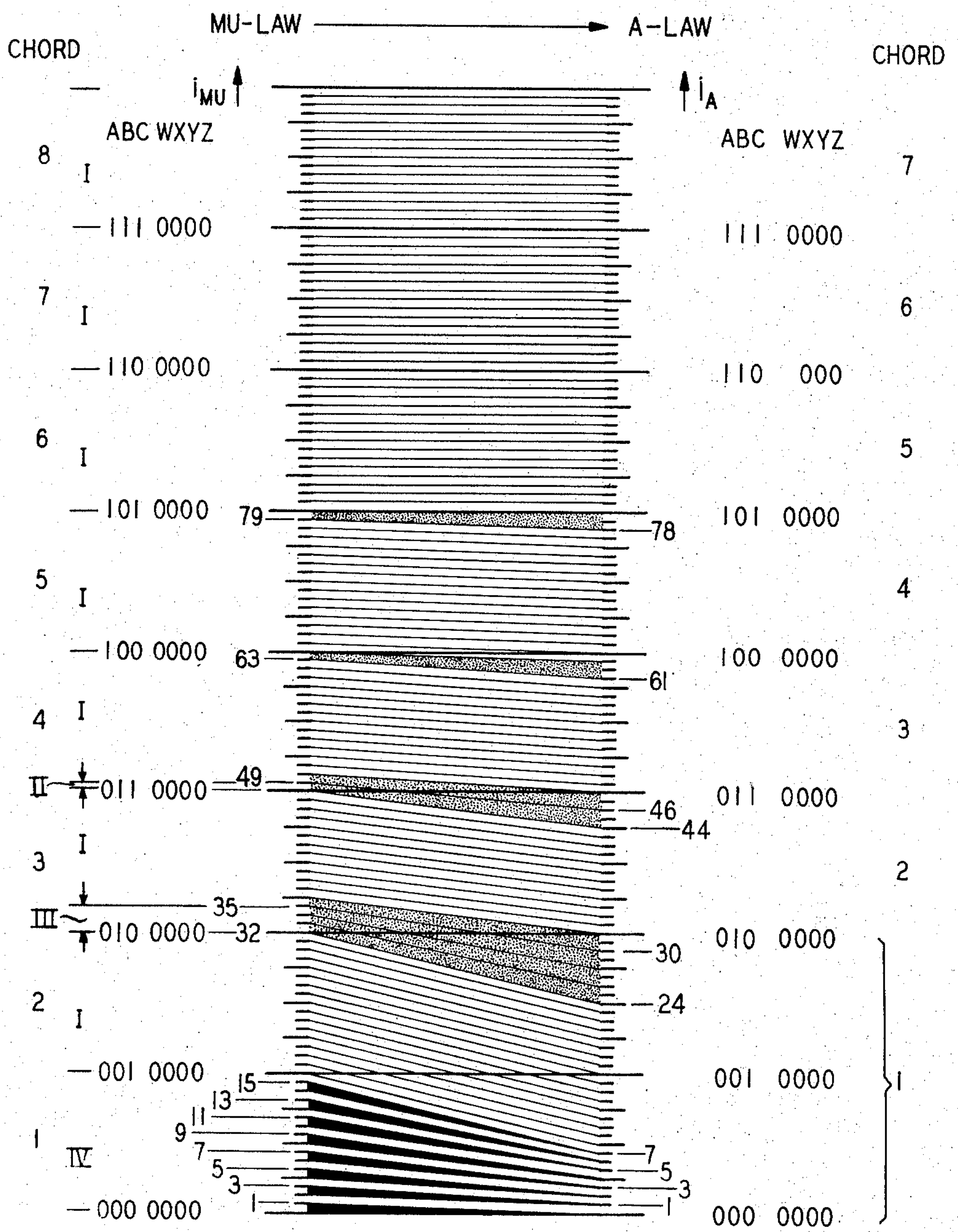
FIG. 7 illustrates the complete code conversion from mu-law to A-law implemented by the present invention.

A minimum-noise mu to A conversion is shown partially in FIG. 3 and completely in FIG. 7. A minimum-noise A to mu conversion is shown in FIG. 4.

Figure 4:
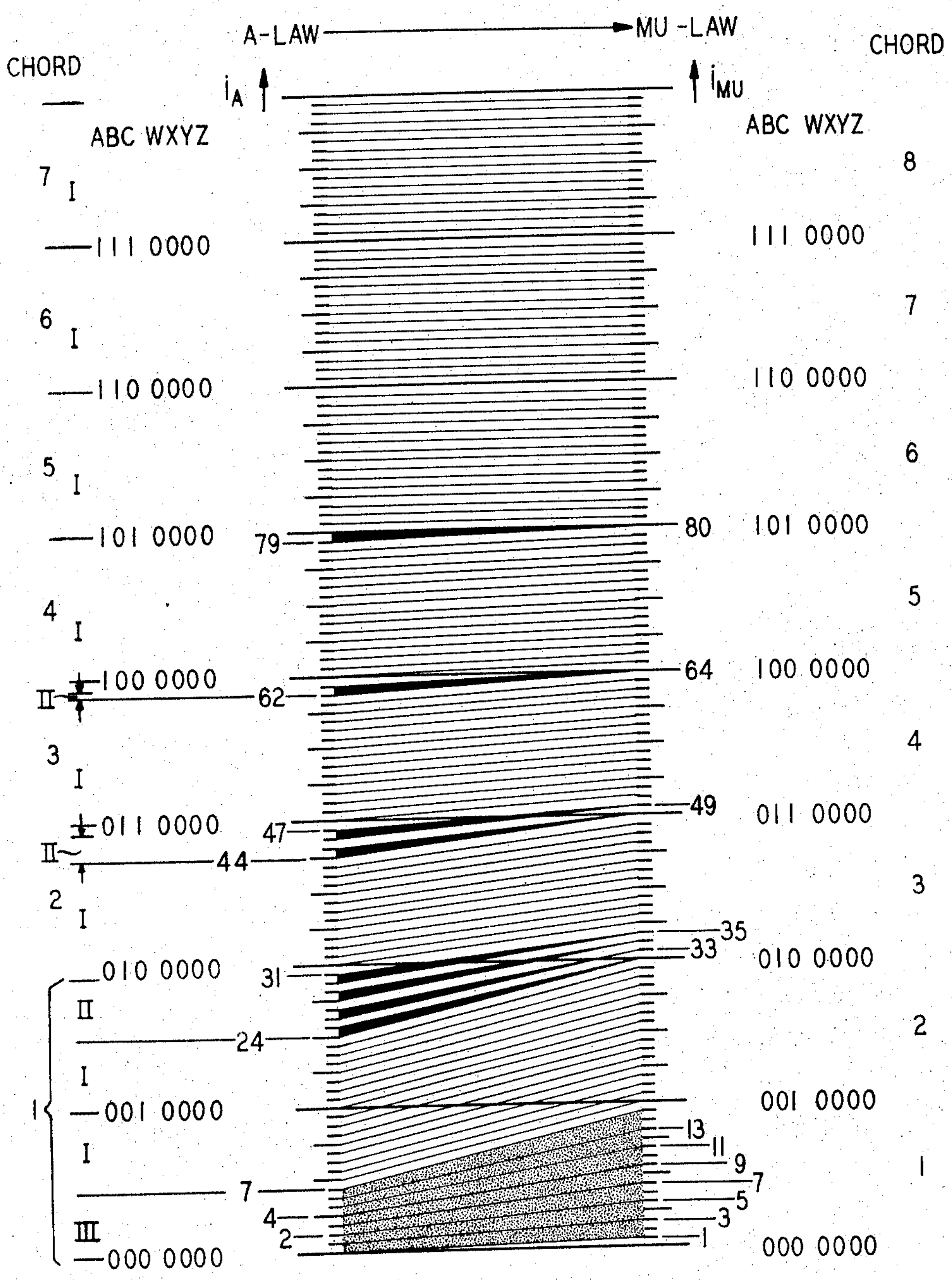
FIG. 4 illustrates the complete code conversion from A-law to mu-law implemented by the present invention.
Figure 5:
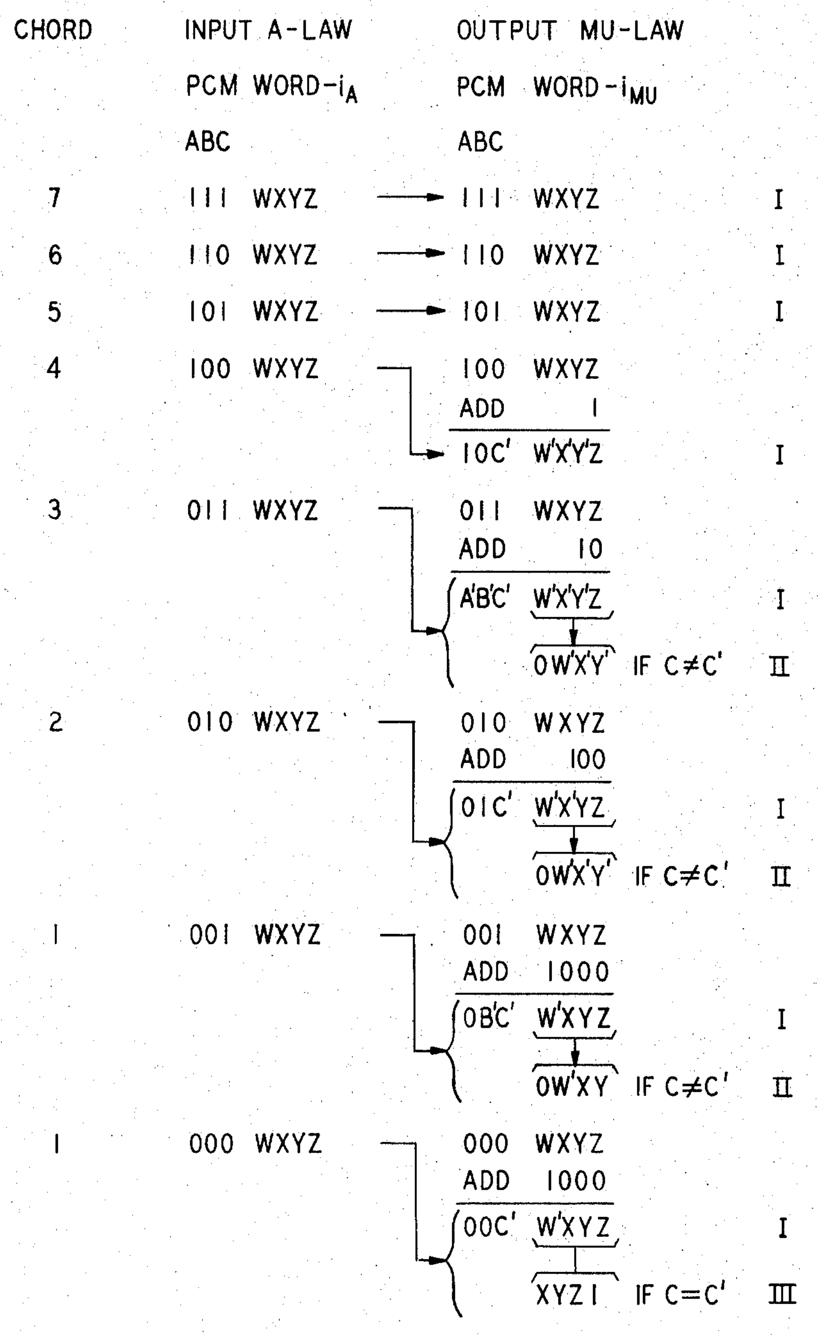
FIG. 5 illustrates the conversion of FIG. 4 in numerical format.
Figure 6:
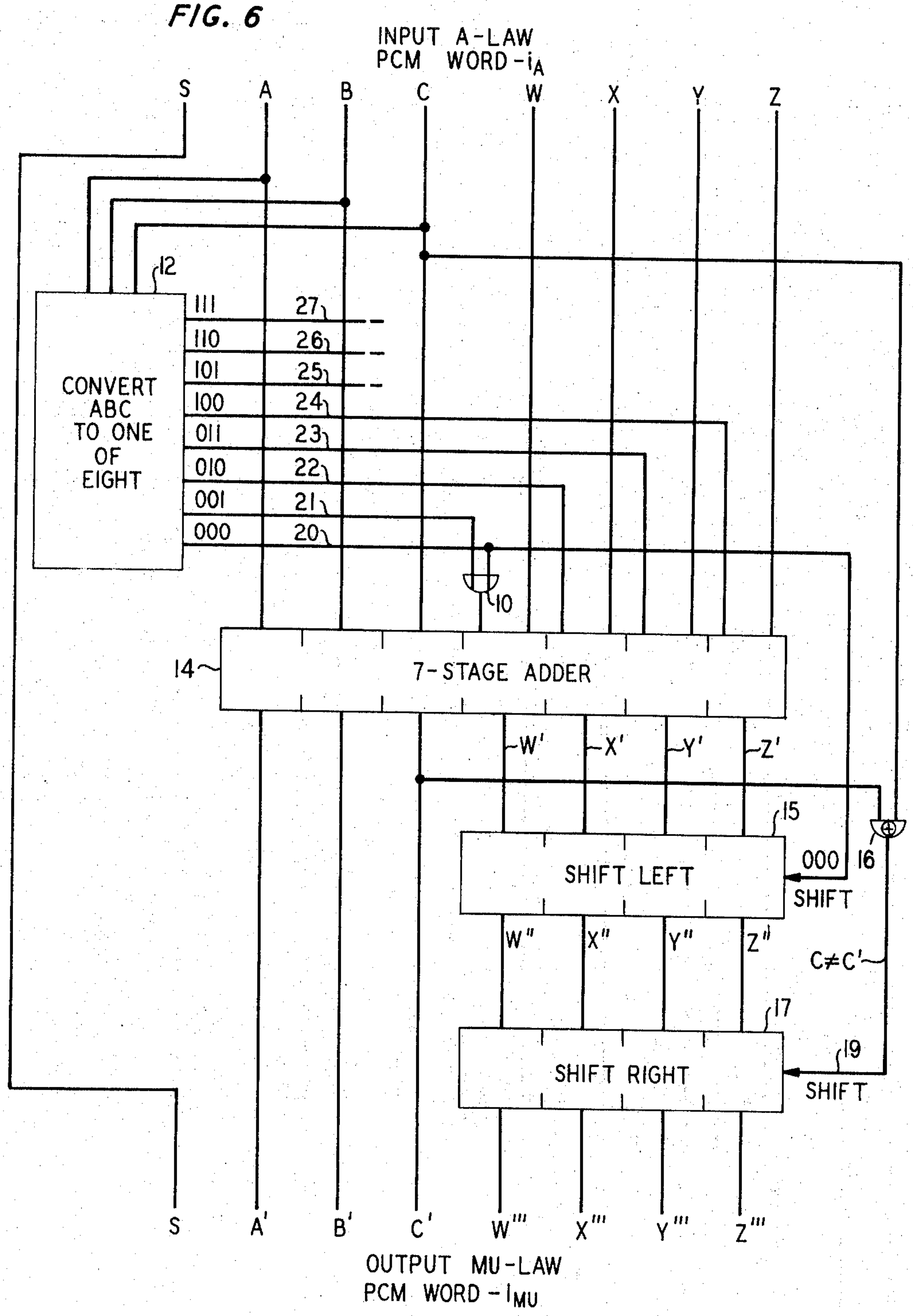
FIG. 6 is a first embodiment of the invention implementing A-law to mu-law conversion.

FIGS. 4, 5 and 6 show the development of an embodiment of the invention which implements A-law to mu-law code conversion. FIG. 4 specifies a minimum-noise conversion from each of the 128 $i_A$ values into $i_{mu}$ values expressed as binary numbers. For ease of reference, a few selected values of $i_A$ and $i_{mu}$ are also shown in their decimal equivalent. It will be noted that for $i_A$ chords 5,6 and 7 $i_{mu} = i_A$. For the major portion of $i_A$ chord 4, $i_{mu} = i_A + 1$. Similarly, for the major portion of $i_A$ chord 3, $i_{mu} = i_A + 2$. For the major portion of $i_A$ chord 2, $i_{mu} = _A + 4$. For the middle portion of $i_A$ chord 1, $i_{mu} = i_A + 8$. This systematic mathematical relationship between $i_{mu}$ and $i_A$ suggests that the value of $i_{mu}$ can be recovered from the value of $i_A$ through the addition of a suitable constant which constant depends on the $i_A$ segment code ABC. Portions of $i_A$ chords 1–7 for which $i_A$ has a simple additive relationship to the corresponding value of $i_{mu}$ have been labelled I in FIG. 4. For values of $i_A$ which cannot be converted to $i_{mu}$ by simple addition alone, additional steps must be taken which include right shift (labelled II) and left shift (labelled III). These considerations lead to the numerical representation of the A-law to mu-law conversion which is shown in FIG. 5.

In FIG. 5, each value of ABC has been separately shown with a suitable transformation to create the output mu-law word. As was noted above, the basic transformation is to add a suitable constant to the $i_A$ value which constant is chosen according to the identity of ABC. Having added the appropriate constant, it is seen that in certain instances for values of ABC equal to 001, 010 and 011, the proper $i_{mu}$ word is obtained by shifting the altered position code one bit to the right. In the case of ABC = 000, the proper transformation is obtained when the altered position code is shifted one bit to the left and a one inserted into the least significant bit position. Labels I, II and III identify the same selected portions of $i_A$ chords 1–7 as in FIG. 4.

Since two possible courses of action are necessary for values of segment code ABC ranging from 000 to 011 (e.g., shift position code WXYZ or refrain from shifting) it remains to be determined on what basis the decision should be made to choose the proper step. The method chosen for making this determination is to detect those cases in which the lowest order significant digit of the segment code has been altered by the step of addition; that is, those cases for which C ≠ C′. This situation occurs when a carry digit has been propagated from the high order bit of the altered position code to the low order bit of the altered segment code.

For case I in FIGS. 4 and 5, no additional steps are necessary after the incrementation of $i_A$. This is true for chords 5, 6 and 7 where a special form of addition has taken place (e.g., incrementation by zero). It is also true for those values of $i_A$ chords 1, 2, 3 and 4 for which incrementation by a non-zero constant is performed. Case II is the condition requiring a right shift of the position code following the step of addition. Case III is the condition requiring a left shift of the altered position code and insertion of a one which occurs for values of ABC = 000 for which no change has been detected in the low order bit of the segment code.

The circuit of FIG. 6 illustrates an embodiment which implements simply and completely the numerical transformations indicated in FIG. 5. The A-law PCM code word S ABC WXYZ enters at the top of the circuit of FIG. 6 on the leads designated with the names of the corresponding bits. Throughout the following description bit names and lead names are used interchangeably where no confusion may result. Thus "W" refers to the high order bit position of the position code and will be understood to also designate the binary signal appearing on lead W, or the lead W itself. The sign bit S is conveyed directly to the output without alteration. The segment code ABC is conveyed to decoder 12 which converts the binary value of ABC to a signal on one of eight output leads 20 through 27. For this embodiment, only leads 20 through 24 are utilized. Leads 25 through 27 may alternatively be absent, and the circuits which produce outputs on leads 25 through 27 may be eliminated if desired. Thus, decoder 12 may be alternatively designated a one-out-of-five decoder where it is understood that the five combinations of interest are five of the possible eight combinations of the three bits ABC.

The seven bits ABC WXYZ are applied as the addend to seven-stage adder 14. Leads 22 through 24, outputs from decoder 12 are applied as augend bits to the three low order stages of adder 14. Leads 20 and 21 are connected to OR gate 10 which in turn is connected as an augend bit to the high order position code stage of adder 14. In operation, a value of ABC = 100 will cause a one to appear on lead 24 thereby causing the signals on output leads A′, B′, C′, W′, X′, Y′ and Z′ to take on the value of ABC WXYZ incremented by one through the action of adder 14. Similarly, values of segment code ABC = 011 and 010 cause the input PCM code to be incremented by two and four respectively. Values of segment code ABC = 000 and 001 cause the input PCM code to be incremented by eight. Lead 20 also extends to shift-left circuit 15 and causes circuit 15 to perform the shift-left function on bits W′X′Y′Z′ which emerge from the low order four stages of adder 14. Circuit 15 shifts a one into the low order bit position Z″ when a left shift is performed. The result is conveyed from shift-left circuit 15 to shift-right circuit 17 on leads W″, X″, Y″ and Z″. Shift-right circuit 17 is controlled by lead 19 and causes a shift of its input right by one bit, producing output on leads W‴, X‴, Y‴ and Z‴. Circuit 17 shifts a zero into the high order bit position W‴ when a right shift is performed. Details of the construction of shift circuits 15 and 17 are shown in FIG. 10.

Lead 19 is energized by exclusive-OR gate 16 which detects a change in the low order bit position of the segment code. Exclusive-OR gate 16 is controlled by signals appearing on lead C and signals appearing on lead C′. Lead C′ carries the low order bit position of the altered segment code which emerges from adder 14 on leads A′, B′ and C′. As a result of the action of the circuit of FIG. 6, the converted PCM code word emerges encoded in the mu-law on leads S, A′, B′, C′, W‴, X‴, Y‴ and Z‴.

The circuit of FIG. 6 can be seen to implement the conversion shown in FIG. 5. For values of ABC = 101, 110 and 111, no addition is performed by adder 14, and the seven bits of the input word pass through the adder without change resulting in an effective incrementation by zero. Similarly, shift-left circuit 15 performs no shift action. Since C = C′, shift circuit 17 performs no shift action and the input PCM word emerges as the output PCM word.

For ABC = 100, a one appears on lead 24, incrementing the PCM word at adder 14 by one. If WXYZ = 1111 ($i_A$ = 79), the process of addition will cause a carry to propagate to the segment code portion of adder 14, changing ABC from 100 to 101. In this case the low order bit of the incremented segment code C′ is different from the low order bit of the original segment code C; that is, C ≠ C′, which causes exclusive-OR gate 16 to energize lead 19 which, in turn, causes shift-right circuit 17 to operate. Since, however, W′X′Y′Z′ = 0000, this shift will have no apparent effect on the output. For all values of WXYZ less than 1111, no carry will be propagated to the low order bit of the segment code portion of adder 14. Thus, C = C′ and shift circuit 17 will not perform any shift action. Shift circuit 15 will not perform any shift for ABC = 100.

For ABC = 011, lead 23 is energized by decoder 12, causing adder 14 to increment the PCM word by two. In the event that WXY = 111 ($i_A$ greater than 61), a carry will be propagated into the low order bit position of the segment code portion of adder 14. In this case, C ≠ C′ and shift circuit 17 will shift the position code right by one bit. For all other values for which ABC = 011, no carry will be propagated; C = C′ and the incrementation of the PCM word will be the only process that is performed.

Similar events occur for ABC = 010. When WX = 11 ($i_A$ greater than 43), C ≠ C′ and the position code is shifted right. Otherwise incrementation by four is the only process performed. Also, for ABC = 001, a similar process takes place. The signal appearing on lead 21 proceeds through OR gate 10 to increment the value at adder 14 by eight. When W = 1 ($i_A$ greater than 23), C ≠ C′ and the position code is shifted right. Otherwise, incrementation by eight is the only process performed.

When ABC = 000, lead 20 is energized. The signal passes through OR gate 10 and increments the value at adder 14 by eight. Also, the signal proceeds to shift-left circuit 15 which causes the altered position code bits appearing at the output of adder 14 to be shifted to the left by one bit position and a one to be inserted in the low order bit position. This process occurs uniformly on all values of $i_A$ for which ABC = 000. When W = 0 ($i_A$ less than 8), no carry is propagated into the segment code portion of adder 14 and C = C′ therefore leaving exclusive-OR gate 16 unenergized and preventing a right shift at circuit 17. Thus when C = C′, only circuit 15 affects the output of adder 14. When W = 1 ($i_A$ between 7 and 16) a carry is propagated to the low order bit position of the segment code portion of adder 14, C ≠ C′, exclusive-OR gate 16 is energized which causes shift circuit 17 to restore bits X′Y′Z′ back to their original position, emerging as bits X‴Y‴Z‴. Bit W‴ is made zero by this process. However, bit W′ was already a zero after the addition step was performed and the carry propagated to bit C′. Therefore, the combined effect of operating shift circuit 15 and shift control 17 is to convey W′X′Y′Z′ to leads W‴, X‴, Y‴ and Z‴ apparently unaltered in the case of W = 1.

From the above detailed description of the action of the circuit of FIG. 6 it is seen that the circuit correctly performs the code conversion illustrated in FIGS. 4 and 5. For values ABC = 101, 110, 111, incrementation of zero takes place, and the output PCM code word equals the input word. For ABC = 100, the value of $i_A$ is incremented by one. In the case where C ≠ C′, shift-right circuit 17 shifts all zeros and thus doesn't alter the value of W′X′Y′Z′. For ABC = 001, 010 and 011, the PCM code is incremented by eight, four and two, respectively. When C ≠ C′, the position code is in-right one bit. For ABC = 000, the position code is incremented by eight and shifted left by one position with a low order one inserted. For C ≠ C′, the left shift is canceled by a subsequent right shift which leaves the position code unaltered. When C= C′, the right shift is not performed and only the left shift is effective.

Figure 8:
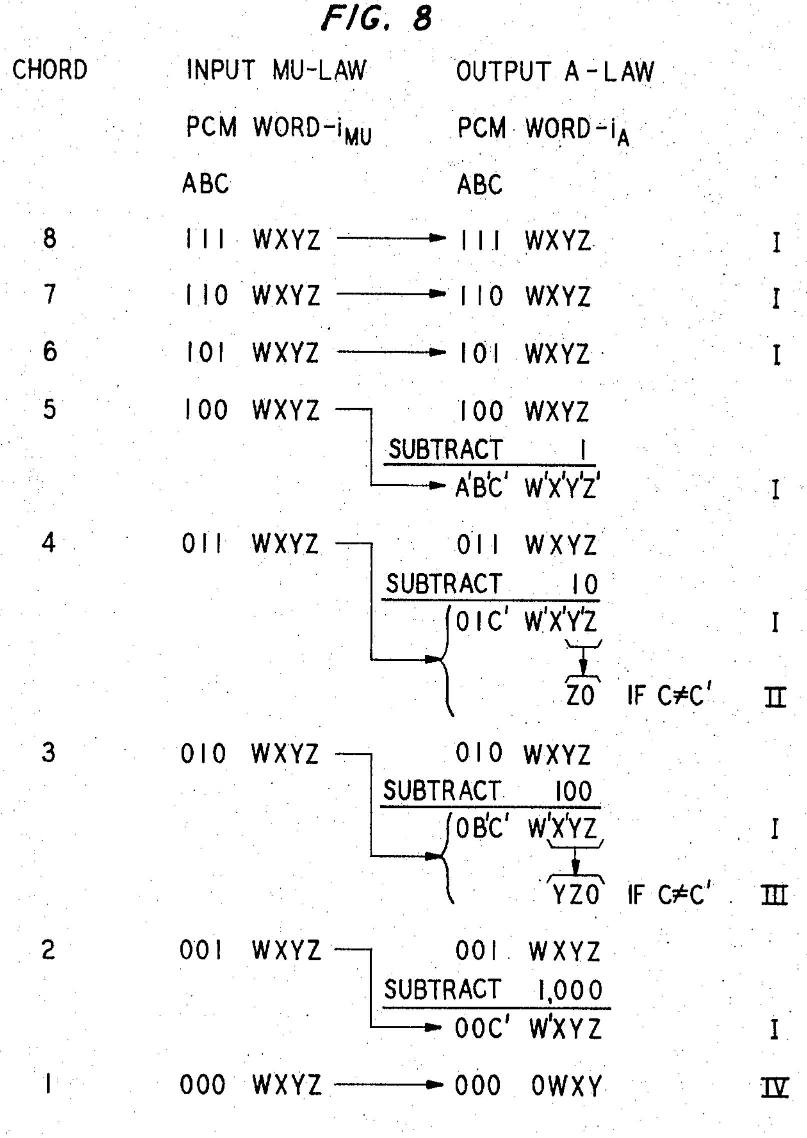
FIG. 8 illustrates the conversion of FIG. 7 in numerical format.
Figure 9:
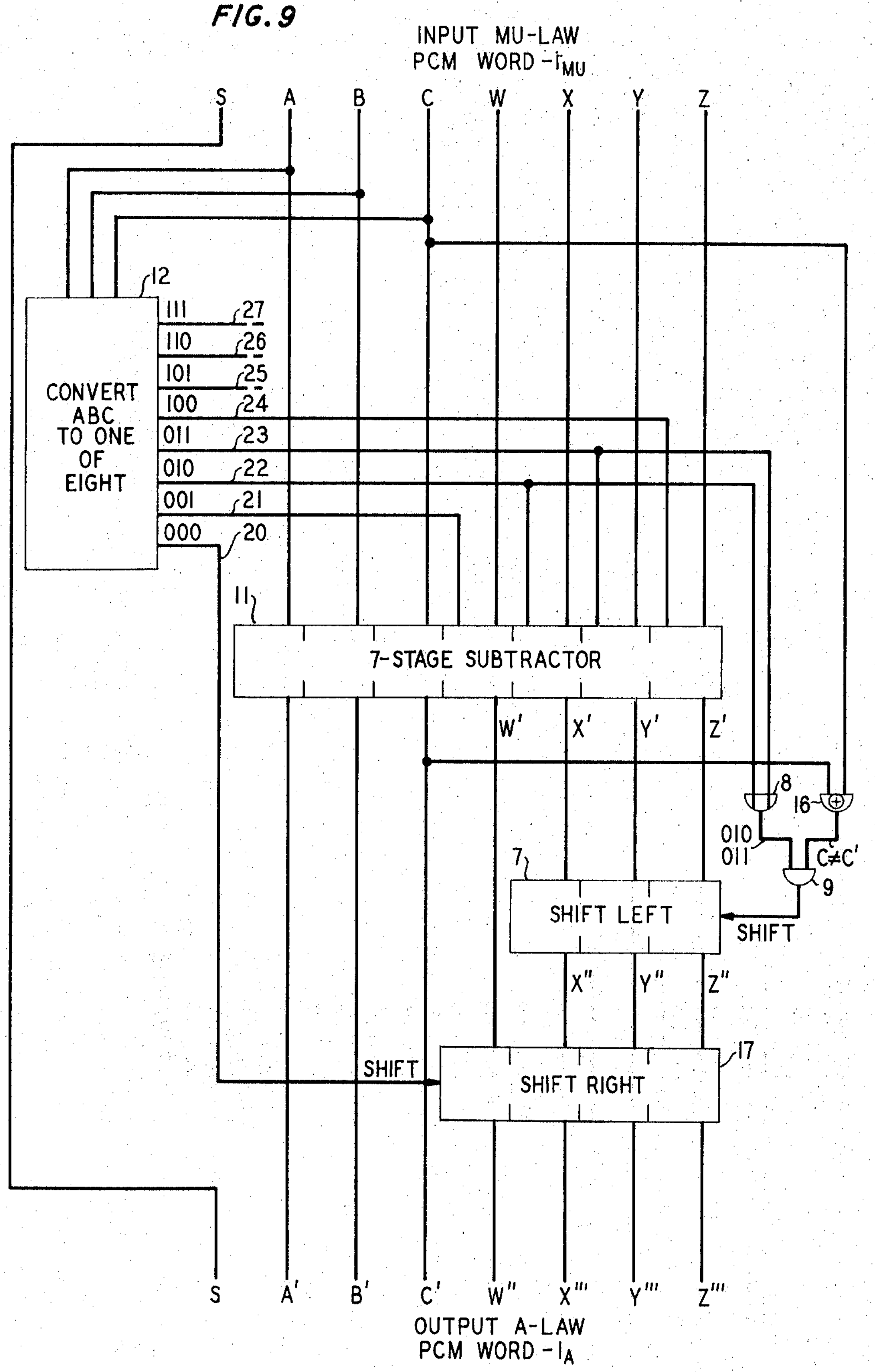
FIG. 9 is a second embodiment of the invention implementing mu-law to A-law conversion; (borrow).
Figure 10A:
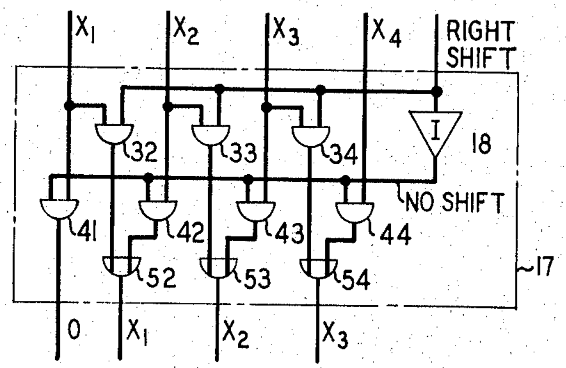
FIGS. 10(*a*) through 10(*d*) show circuit details of various shift circuits used in FIGS. 6 and 9.
Figure 10B:
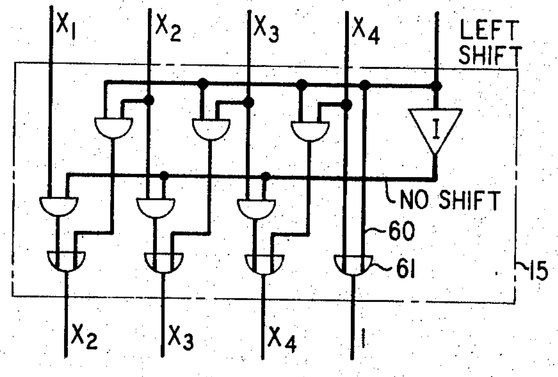
Figure 10C:
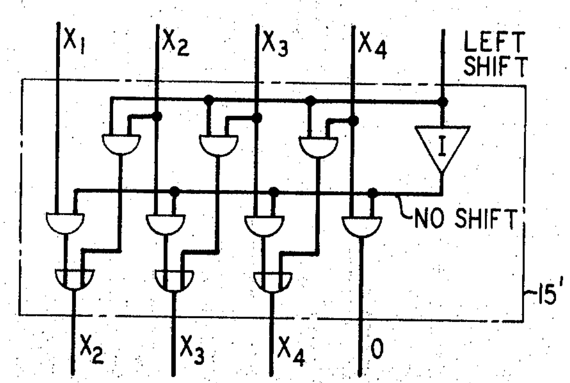
Figure 10D:
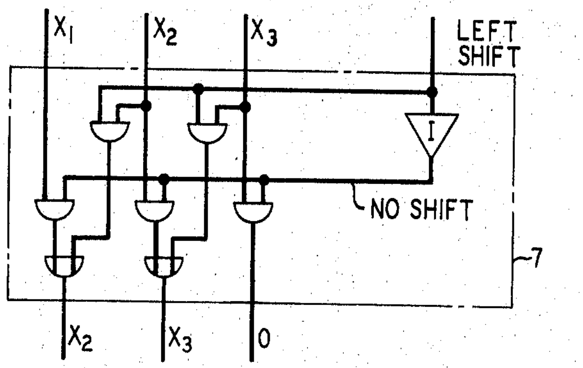

FIGS. 7, 8 and 9 show the development of an embodiment of the invention, similar to that above described with respect to FIGS. 4, 5 and 6, which implements mu-law to A-law code conversion. FIG. 7 specifies a minimum noise conversion from $i_{mu}$ values to $i_A$ values. For those values of $i_{mu}$ labeled I, the corresponding values of $i_A$ may be obtained by a simple subtraction process. For $i_{mu}$ chords 6, 7 and 8, zero is the subtracted constant. For chord 5, the constant is one. For chord 4, the constant is two. For chord 3, the constant is four, and for chord 2 the constant is eight. For those portions of the chords labeled II–IV, steps of shifting must be performed in addition to or in lieu of the step of subtraction.

The details of mu to A conversion are shown numerically in FIG. 8. Labels I through IV correspond to the values of $i_{mu}$ similarly labeled in FIG. 7. In chord 4 it is seen that the proper conversion is completed by left shifting the two low order bits of the altered position code after subtraction of two. In chord 3 the low order three bits of the altered position code are shifted to the left. For chord 1 the position code bits are right shifted by one bit position. The decision to shift the altered position code is based on the detection of a change in the least significant bit of the segment code as was done for the embodiment of FIG. 6 previously described. Those situations arising in chords 3 and 4 for which left shift is necessary cause a borrow to be propagated from the high order bit W' of the position code to the low order bit C' of the segment code so that C ≠ C'.

The circuit of FIG. 9 illustrates an embodiment which implements the conversion of FIG. 8 from mu-law to A-law. The mu-law PCM code word S ABC WXYZ enters at the top of FIG. 9 on the leads so designated. The sign bit is conveyed directly to the output without alteration. The segment code ABC is conveyed to decoder 12 which operates in an identical fashion as that described in conjunction with FIG. 6 above. The seven bits ABC WXYZ are applied as the minuend to seven-stage subtractor 11. Leads 21 through 24, outputs from decoder 12, are applied as subtrahend bits individually to the four low order stages of subtractor 11. In operation, a value of ABC = 100 will cause a one to appear on lead 24, thereby causing subtractor 7 to decrement the value of ABC WXYZ by one, producing the decremented value A'B'C' W'X'Y'Z' on the output leads of subtractor 11 which are so designated. Similarly, values of segment code ABC = 011, 010 and 001 cause decrementation by 2, 4 and 8, respectively. Leads C and C' extend to exclusive-OR gate 16 which produces an output conveyed to AND gate 9 when C C'. Leads 23 and 22 extend to OR gate 8 which produces an output conveyed to AND gate 9 when the value of ABC is either 011 or 010. AND gate 9 is energized by the simultaneous presence of outputs on leads extending from OR gate 8 and exclusive-OR gate 16 and produces a shift signal which extends to shift-left circuit 7. Shift-left circuit 7 has three stages with inputs X'Y'Z' and outputs X''Y''Z''. Lead 20 extends to shift-right circuit 17 which has four stages with input W'X''Y''Z'' and output W'''X'''Y'''Z'''. Shift-right circuit 17 causes the four input bits to be shifted right one binary position and a zero to be inserted in the vacated high order bit position. Shift-left circuit 7 causes the three input bits to be shifted left one bit position and a zero inserted in the vacated low order bit position. Details of construction of shift circuits 7 and 17 are shown in FIG. 10. As a result of the action of the circuit of FIG. 9, the converted PCM code word emerges encoded in the A-law on leads S, A', B', C', W'X'''Y''' and Z'''.

The circuit of FIG. 9 implements the conversion of FIG. 8. For values of ABC = 101, 110 and 111, the seven bits of the input PCM word pass through subtractor 11 without change resulting in an effective decrementation of zero. Shift circuits 7 and 17 perform no shift action and the input PCM word emerges as the output PCM word. For ABC = 100, lead 24 is energized causing subtractor 11 to decrement the PCM word by one. Shift circuits 7 and 17 perform no shift action.

For ABC = 011, lead 23 is energized by decoder 12, causing subtractor 11 to decrement the PCM word by two. In the event that WXY = 000 ($i_{mu}$ less than 50) subtractor 11 will perform a borrow operation from the low order bit position of the segment code portion of subtractor 11. This will cause C ≠ C' and exclusive-OR gate 16 will be energized. Or gate 8 will be energized by the signal on lead 23. AND gate 9 will operate, sending a shift signal to shift-left circuit 7. Circuit 7 will cause the value of Y'Z' to appear as X''Y''. Output lead Z'' will take on the value zero. A shift of the Y' bit onto the X'' lead performs no effective change in the value of X'' because, following decrementation, W'X'Y' = 111 and hence X' = Y' = 1. In effect, only the two low order bits emerging from subtractor 11 appear to be shifted left by shift-left circuit 7. Shift-right circuit 17 performs no shift action.

For ABC = 010, lead 22 is energized and the input PCM word is decremented by four at subtractor 11. When WX = 00 ($i_{mu}$ less than 36), a borrow is propagated to the low order stage of the segment code portion of subtractor 11, C ≠ C', gates 8, 16 and 9 are operated and circuit 7 performs a left-shift operation. The three input bits X'Y'Z' are shifted left by one bit position and a zero inserted in the low order bit position. Shift-right circuit 17 performs no shift action.

For ABC = 001, lead 21 is energized, decrementing the PCM word by eight. Shift circuits 7 and 17 perform no shift action.

For ABC = 000, no decrementation of the PCM word takes place. Shift-right circuit 17 is energized which shifts the position code bits of the input PCM word right by one bit position.

From the above detailed description of the action of the circuit of FIG. 9 it is seen that the circuit correctly performs the code conversion illustrated in FIGS. 7 and 8. For values ABC = 101, 110 and 111, decrementation by zero takes place and $i_A$ equals the input word $i_{mu}$. For ABC = 100, the value of $i_{mu}$ is decremented by one. For ABC = 011, $i_{mu}$ is decremented by two. In the case where C ≠ C', shift circuit 7 shifts the low order three bits left one bit position which leaves the highest order shifted bit equal to its original value. For ABC = 010, $i_{mu}$ is decremented by four, and the low order three bits are left shifted by one position in the case where C 24 C'. For ABC = 001, $i_{mu}$ is decremented by eight. For ABC = 000, the position code of $i_{mu}$ is right shifted by one bit position.

Throughout the above description in both A to mu and mu to A conversion it has been assumed that the A-law PCM code is mid-riser in design as illustrated in FIG. 2. In the detailed description above concerning FIG. 2 it was pointed out that the A-law can be redesigned to be mid-tread by decreasing each analog signal value by one half unit. This would be illustrated in FIG. 2 by shifting each output and decision level to the left by one-half unit on the horizontal axis and eliminating decision level $e_0$. With this change in the A-law, A to mu and mu to A conversion can be performed by the circuits of FIGS. 6 and 9, respectively, with minor alteration. The circuit of FIG. 9 is the same whether the A-law is mid-riser or mid-tread and no change is necessary. The circuit of FIG. 6 is altered slightly in that shift-left circuit 15 is replaced by a shift-left circuit 15' which inserts a zero in the vacated low order bit position when a left shift is performed for the mid-tread case. This is in contrast to shift-left circuit 15 which inserts a one. With this one minor change the circuits of FIGS. 6 and 9 may be used for mid-tread A-law code.

FIG. 10 shows construction details of the shift-left and shift-right circuits used in FIGS. 6 and 9. Shift-right circuit 17 of FIGS. 6 and 9 is shown at FIG. 10(a). The shift signal energizes AND gates 32, 33 and 34. Information on the three high order input leads is conveyed through AND gates 32, 33 and 34 to OR gates 52, 53 and 54, respectively, to emerge on the three low order output leads of circuit 17. Inverter 18 prevents AND gates 41, 42, 43 and 44 from passing any signals, causing a zero to appear on the high order output lead. When shift signal is not present, AND gates 32, 33 and 34 are prevented from passing signals. Inverter 18 energizes AND gates 41, 42, 43 and 44. The information on the high order input lead passes through AND gate 41 to the high order output lead. Signals appearing on the three low order input leads pass through AND gates 42, 43 and 44 and OR gates 52, 53 and 54, respectively, to appear on the three low order output leads, respectively.

Shift-left circuit 15 of FIG. 6 is shown at FIG. 10(*b*). This circuit operates in an analogous fashion to the shift-right circuit at FIG. 10(*a*), except that a one is shifted into the low order bit position by the action of lead 60 and OR gate 61. When no shift signal is present OR gate 61 passes the information from the low order input lead to the low order output lead. When the shift signal is present, lead 60 passes a one to OR gate 61, producing a one on the low order output lead. Circuit 15 is used in the circuit of FIG. 6 for the mid-riser form of the A-law as described above.

Shift-left circuit 15' is shown in FIG. 10(*c*) and is intended to replace shift-left circuit 15 of FIG. 6 when FIG. 6 is used with the mid-tread form of A-law. Circuit 15' performs the same action as circuit 15 except that a low order zero is supplied in the output instead of a low order one. Circuit 15' is the left-shift version of circuit 17 appearing at FIG. 10(*a*) and operates in an entirely analogous fashion.

Shift-left circuit 7 appearing in FIG. 9 is shown at FIG. 10(*d*). Circuit 7 is a three bit version of circuit 15' and operates in an entirely analogous fashion.

In the above discussion describing FIGS. 6 and 9 the condition $C \neq C'$ was detected by an exclusive-OR gate in order to determine that a carry (in the case of adder 14) or a borrow (in the case of subtractor 11) was propagated to the low order bit position of the segment code by the addition or subtraction process. In the alternative embodiments shown in FIG. 11 the carry or borrow propagation signal is detected from the internal signals present in the adder or subtractor itself and not from the external manifestation represented by a change between input and output.

Figure 11A:
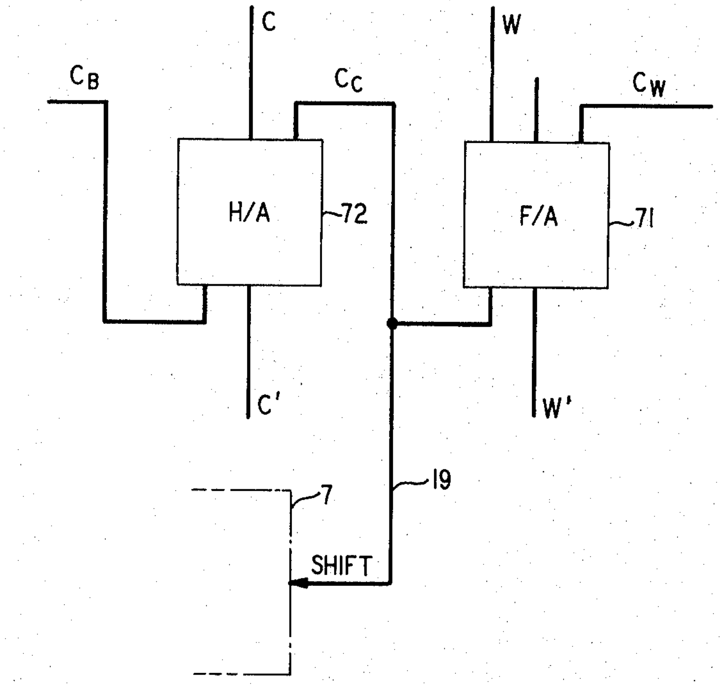
FIGS. 11(*a*) and 11(*b*) show circuit details of alternative control schemes for use in FIGS. 6 and 9.
Figure 11B:
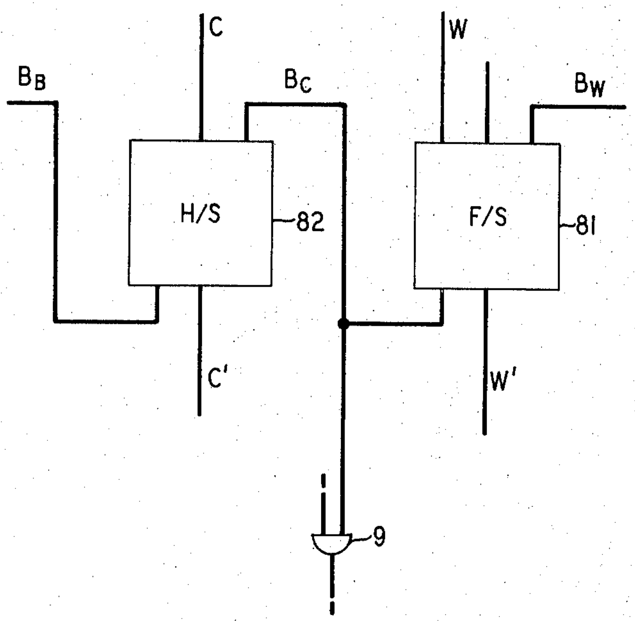

At FIG. 11(*a*) is shown explicitly two of the adder stages of adder 14 in an alternative embodiment of FIG. 6. Stage 71 is a full adder which increments W, the high order bit of the position code. The carry bit from the preceding stage $C_W$ is one of the inputs to stage 71. The carry signal on lead $C_C$ is one of the outputs of adder stage 71 which is carried to stage 72, which increments C, the low order bit of the segment code. Stage 72 may be a half adder since only two inputs are being combined. Stage 71 must be a full adder since three inputs are being combined. It is clear that the occurrence of a carry output $C_C$ conveys the same information as exclusive-OR gate 16 in FIG. 6. Thus lead 19 shown in FIG. 6 may proceed directly to the carry output of the high order bit of the position code W replacing exclusive-OR gate 16.

At FIG. 11(*b*) is shown a similar alternative embodiment suitable for use with the circuit of FIG. 9. Two stages of subtractor 11 are explicitly shown as stage 81 and stage 82 which may be a full subtractor and a half subtractor, respectively. The borrow signal $B_C$ extending from stage 81 to stage 82 may be sensed to detect the same condition that exclusive-OR gate 16 is used for in FIG. 9. The $B_C$ signal may therefore extend directly to an input of AND gate 9, replacing exclusive-OR gate 16 of FIG. 9.

Many modes of construction of the circuits shown in FIGS. 6, 9, 10 and 11 are possible to one with ordinary skill in the art. They may be modified in detail or altogether different circuits may be used to implement the methods taught herein without departing from the scope of the invention. For example, decoder 12 may be a diode matrix decoder; alternatively, the decoder could be made up of AND gates with direct inputs for the leads which have a one signal and with inhibiting inputs for leads which have a zero signal. The output of the AND gates then become leads 20–27, respectively.

The adders and subtractors shown in the figures may be implemented by utilizing half adders and subtractors for the stages which have only one input lead and a carry or borrow from the previous stage. Full adders (subtractors) must, of course, be used for adder (subtractor) stages which have two input leads plus a carry (bottow). Further details of circuit construction may be found in Chapter 9 of Pulse Digital and Switching Waveforms by Millman and Taub, McGraw-Hill, 1965, a standard text on the subject. Details will be found there of the construction of AND gates, OR gates, exclusive-OR circuitry, adders, subtractors, half-adders, half-subtractors, and diode matrix decoders. No attempt has been made herein to enumerate all the possible methods of implementation.

To those skilled in the art of logic circuit design it is evident that the embodiments of FIG. 6, 9, 10 and 11 are combinatorial in nature. This means that the converted code depends only on the input code and appears virtually immediately following the application of the code word at the input. The only delay in achieving the proper output from any circuit element—adder, decoder, etc.—is just the inherent delays of the internal gates themselves, plus the time necessary for the effect of a carry or borrow to propagate through subsequent adder or subtractor stages. Purely combinatorial circuits contain no memory elements and therefore need no initialization.

Alternative embodiments are apparent once the principles of this invention are understood—for example, counters or registers may be employed instead of adders and subtractors. Shift registers instead of shift circuits may be used either for the shifting of bits of the position code, or for aligning a one bit for addition or subtraction at a chosen bit position of the position code. It will be recognized that these methods utilize techniques of sequential circuitry—that is, memory elements are employed. In most cases, initialization will be necessary and implementation may be most easily carried out synchronously under the control of a clock pulse signal for timing.

Still another method of implementation is the use of a digital computer which operates on the bits of an incoming PCM code word and manipulates them through a stored program utilizing the techniques described herein to generate the converted code.

All of these methods of implementation are within the contemplation of the present invention; and still other methods may be advantageously employed without departing from the scope of the invention.

What is claimed is:

1. Apparatus for converting an input code modulation code word encoded according to a first companding law into an output pulse code modulation code word encoded according to a second companding law wherein the input word includes a segment code and a position code comprising:

means for decoding the segment code;

means responsive to signals from said decoding means for selectively arithmetically combining the input code word with a one at a selected bit position thereby producing an altered code word including an altered segment code and an altered position code, wherein said means for combining includes means for propagating internal arithmetic signals;

control means responsive to signals from said decoding means and said combining means for producing left-shift and right-shift signals;

means responsive to the left-shift signal for selectively shifting a portion of said altered position code to the left;

means responsive to the right-shift signal for selectively shifting a portion of said altered position code to the right.

2. Code conversion apparatus as set forth in claim 1 wherein:

said means for arithmetically combining comprises an adder including means for propagating internal carry signals;

said control means comprises means for producing said left-shift signal in response to a selected segment code being decoded by said decoding means, and means for detecting a change occurring in the low order bit of the altered segment code as a result of arithmetically combining in said adder and for producing said right-shift signal in response thereto.

3. Code conversion apparatus as set forth in claim 2 wherein:

said means for detecting and for producing comprises means for comparing the low order bit of the segment code of the input word with the low order bit of the altered segment code of the altered code word.

4. Code conversion apparatus as set forth in claim 2 wherein:

said means for detecting and for producing comprises means for sensing the presence of a carry signal propagating within said adder from the high order bit of the altered position code to the low order bit position of the altered segment code.

5. Code conversion apparatus as set forth in claim 1 wherein:

said means for arithmetically combining comprises a subtractor including means for propagating internal borrow signals, and said control means comprises:

means for producing said right-shift signal in response to a selected segment code being decoded by said decoding means, means for detecting a change occurring in the low order bit of the altered segment code as a result of arithmetically combining in said subtractor, and means for producing said left-shift signal in response to said means for detecting and in response to one of a plurality of selected segment codes being decoded by said decoding means.

6. Code conversion apparatus as set forth in claim 5 wherein:

said means for detecting comprises means for comparing the low order bit of the segment code of the input word with the low order bit of the altered segment code of the altered code word.

7. Code conversion apparatus as set forth in claim 5 wherein:

said means for detecting comprises means for sensing the presence of a borrow signal propagating from the high order bit position of the altered position code to the low order bit position of the altered segment code.

8. A digital code converter for re-encoding a pulse code modulation code word comprising a segment code designated by the bits ABC and a position code designated by the bits WXYZ comprising:

a decoder which operates on bits ABC to produce an output on one of five output leads according to the values of ABC ranging from 000 to 100;

an OR gate for producing an output when the decoder produces an output on either one of two leads according to the values of ABC equal to 000 or 001;

a seven-stage binary adder to which is applied an addend ABCWXYZ and an augend comprising the output from the OR gate and three of the five output leads from the decoder applied to the low order stages of the adder to produce the sum A'B'C'W'X'Y'Z', means for detecting a carry propagating from the high order bit W of the input position code to the low order bit C' of the incremented segment code;

means for shifting the bits W'X'Y'Z' one bit position to the left thereby producing the bits W''X''Y''Z'' in response to an output from the decoder corresponding to the segment code ABC equal to 000; and means for shifting the bits W''X''Y''Z'' one bit position to the right in response to said detecting means.

9. A digital code converter as set forth in claim 8 wherein said converter operates on an input code word encoded according to a mid-riser companding law and said means for shifting the bits W'X'Y'Z' to the left includes means for inserting a one into the low order bit position vacated by the shift.

10. A digital code converter as set forth in claim 8 wherein said converter operates on an input code word encoded according to a mid-tread companding law and said means for shifting the bits W'X'Y'Z' to the left includes means for inserting a zero into the low order bit position vacated by the shift.

11. A digital code converter for re-encoding a pulse code modulation code word comprising a segment code designated by the bits ABC and a position code designated by the bits WXYZ comprising:

a decoder which operates on bits ABC to produce an output on one of five output leads according to the values of ABC ranging from 000 to 100;

an OR gate for producing an output when the decoder produces an output on either one of two leads according to the values of ABC equal to 010 or 011;

a seven-stage binary subtractor to which is applied an minuend ABCWXYZ and a subtrahend comprising the outputs on the five output leads from the decoder applied to the low-order stages of the subtractor to produce the difference bits A'B'C'W'X'Y'Z';

means for detecting a borrow propagating from the high order bit W of the input position code to the low order bit C' of the decremented segment code;

means for shifting the three bits X'Y'Z' one bit position to the left thereby producing the bits X''Y''Z'' in response to an output from the OR gate and in response to said detecting means; and means for shifting the four bits W'X''Y''Z'' one bit position to the right in response to an output from the decoder corresponding to the segment code ABC equal to 000.

* * * * *